United States Patent
Monnier et al.

(10) Patent No.: US 8,646,427 B2
(45) Date of Patent: Feb. 11, 2014

(54) SYSTEM FOR POWERING A VEHICLE WITH A HEAT ENGINE AND PROVIDED WITH AN AUTOMATIC STOP AND RESTART SYSTEM

(75) Inventors: Erwan Monnier, Puteaux (FR); Bernard Boucly, Le Chesnay (FR); Christophe Ferlin, Voisins le Bretonneux (FR); Stephane Carubelli, Chevilly la Rue (FR)

(73) Assignee: Peugeot Citroen AutomobilesSA, Velizy Villacoublay (FR)

( * ) Notice: Subject to any disclaimer, the term of this patent is extended or adjusted under 35 U.S.C. 154(b) by 0 days.

(21) Appl. No.: 13/321,778

(22) PCT Filed: Apr. 26, 2010

(86) PCT No.: PCT/FR2010/050788
§ 371 (c)(1),
(2), (4) Date: Nov. 21, 2011

(87) PCT Pub. No.: WO2010/136688
PCT Pub. Date: Dec. 2, 2010

(65) Prior Publication Data
US 2012/0062028 A1 Mar. 15, 2012

(30) Foreign Application Priority Data
May 29, 2009 (FR) ..................................... 09 53553

(51) Int. Cl.
*F02N 1/00* (2006.01)
*F02N 11/00* (2006.01)

(52) U.S. Cl.
USPC .................................. 123/179.28; 123/179.1

(58) Field of Classification Search
USPC ................ 123/179.1, 179.28; 180/65.1, 65.2, 180/65.31; 290/1 A, 1 B; 73/114.58, 114.59; 701/112, 113
See application file for complete search history.

(56) References Cited

U.S. PATENT DOCUMENTS

| 6,320,274 B1 | 11/2001 | Goetze et al. |
| 7,102,304 B2 * | 9/2006 | Sebille et al. ................. 318/108 |
| 2003/0088343 A1 * | 5/2003 | Ochiai et al. .................... 701/22 |

(Continued)

FOREIGN PATENT DOCUMENTS

| FR | 2843842 A1 | 2/2004 |
| FR | 2853154 A1 | 10/2004 |
| FR | 2902705 A1 | 12/2007 |
| WO | 99/28157 A1 | 6/1999 |

OTHER PUBLICATIONS

International Search Report corresponding to International Application No. PCT/FR2010/050788, mailed on Aug. 2, 2010.

*Primary Examiner* — Stephen K Cronin
*Assistant Examiner* — Sizo Vilakazi
(74) *Attorney, Agent, or Firm* — Polster Lieder Woodruff & Lucchesi, L.C.

(57) ABSTRACT

The invention relates to a system for powering a vehicle with a heat engine and provided with an automatic stop and restart system for the heat engine, wherein said powering system comprises an onboard grid to which electric consumers are connected, means (16) for starting/restarting the engine, a battery (11) powering the onboard grid and the starting/restarting means, and a DMT device (12, 15) for maintaining the voltage. According to the invention, the onboard grid (10) is connected to the battery (11) via the DMT device (12, 25), and the DMT device (12, 25) is preferably connected to the positive terminal P of the battery.

12 Claims, 1 Drawing Sheet

(56) References Cited

U.S. PATENT DOCUMENTS

2004/0112320 A1 * 6/2004 Bolz et al. .............. 123/179.28
2006/0108954 A1 5/2006 Sebille et al.
2010/0298088 A1 11/2010 Rouis et al.

* cited by examiner

SYSTEM FOR POWERING A VEHICLE WITH A HEAT ENGINE AND PROVIDED WITH AN AUTOMATIC STOP AND RESTART SYSTEM

CROSS-REFERENCE TO RELATED APPLICATIONS

This application is the US National stage, under 35 U.S.C. §371, of International App. No. PCT/FR2010/0050788 which claims the priority to French application 0953553 which was filed on May 29, 2009.

BACKGROUND OF THE INVENTION

The present invention relates to an electrical power supply system for an automotive vehicle with internal combustion engine equipped with an automatic stop and restart device for the internal combustion engine; the device often being designated as "Stop & Start" (S&S).

Automotive vehicles are using an increasing number of electrical devices. As examples we can mention S&S devices, power steering, climate control units or electric brakes.

The majority of these devices consume high electrical current during short times. It was therefore necessary to add to the traditional 12 volt battery one or more supplementary sources of electrical energy, in order to be able to supply the required electrical power and in order to avoid voltage drops in the onboard electrical network to which the various electricity consuming devices of the vehicle are connected.

One traditional solution consists in using as a supplementary energy source a second battery or one or more high power capacitors. These capacitors are usually called super capacitors and are designated by the term Ucap. These super capacitors are in general associated with DC/DC type converters in order to adapt their voltage to the supply voltage of the electrical devices that they feed.

Certain vehicles on the market are equipped with a voltage maintaining device, known under the abbreviation DMT, which is mounted in series or in parallel with the battery. The DMT consists of an additional energy source controlled by electronics, which facilitates the starts and avoids voltage drops in the onboard electrical network of the vehicle.

These solutions in fact pose complexity problems for the electrical architecture of the vehicle, resulting in increase of the vehicle mass, loss of available space under hood due to the space occupied by the DMT and reduction in performance of the devices not supplied by the converter.

As an example, we can mention patent FR 2902705 which relates mainly to a plurality of control strategies for a microhybrid system of an automotive vehicle, whereby all the intelligence necessary for controlling the micro-hybrid system is integrated in the system. The disadvantages of the proposed solution in FR 2902705 are, on the one hand, the use of a significant number of elementary cells (in general 2.5 V) of super capacitors and, on the other hand, the connection of the super capacitors to the electrical ground.

We can also mention patent EP 1034092 which relates to an electrical circuit of an automotive vehicle, whereby the circuit is equipped with a second source of electrical energy and with a plurality of relays. The described configuration is similar to the aforementioned patent FR 2902705: the super capacitor is charged with approximately the same voltage as the battery and is connected to the ground.

BRIEF SUMMARY

A new architecture for the electrical power system of a vehicle is proposed which allows for the total or partial elimination of at least one of the disadvantages of the known solutions.

More precisely, an electrical power supply system for a vehicle with internal combustion engine equipped with an automatic stop and restart device for the combustion engine comprises an onboard electrical network to which electricity consuming devices are connected, means for starting/restarting the engine, a battery supplying the onboard electrical network and the start/restart means, and a DMT voltage maintaining device.

According to one aspect of the system, the onboard electrical network is connected to the battery through the intermediary of the DMT device.

In an advantageous manner, the DMT device is connected to the positive pole of the battery.

According to a first embodiment, the start/restart means of the engine is connected to the DMT device, downstream of the DMT device, the DMT being a centralized device through which all the electrical current of the vehicle flows. The start/restart means can be connected between the DMT device and the mass GMP of the powertrain group.

According to a second embodiment of the invention, the start/restart means is connected to the battery, upstream of the DMT device. In this embodiment, the electrical current supplied to the onboard electrical network passes through the DMT device and the electrical current supplied to the start/restart means does not pass through the DMT device. The start/restart means can be connected between the battery and the GMP mass.

By preference, the system comprises the following characteristics or elements:
- a battery charge indicator connected between the battery and the DMT device.
- the start/restart means can comprise either a starter and an alternator or an alternator-starter.
- the power supply system can comprise a housing comprising at least two of the following elements: the battery charge indicator, means for distributing the electrical energy between the electrical energy consuming devices of the vehicle, means for electrical protection of the vehicle devices, means for electrical switching of the devices, and the DMT device.

According to an alternative embodiment, the DMT device can comprise a supplementary source of electrical energy and means for connecting to the energy source.

According to another alternative embodiment, the DMT device can comprise a current converter and means for connecting to the converter.

BRIEF DESCRIPTION OF THE SEVERAL VIEWS OF THE DRAWINGS

Other advantages and characteristics of the invention will become clear in the following description of several embodiments of the invention, provided as non-limiting examples, with reference to the attached drawings in which:

In FIG. 1 which schematically represents a first embodiment of an electrical power system of a vehicle, an onboard electrical network 10 of the vehicle is electrically connected to a battery 11, for instance a traditional 12 Volt lead acid battery, through the intermediary of a centralized voltage maintaining device DMTc 12 and a charge indicator 13 of the battery 11. The DMTc device 12 consists of two parts: one additional source of electrical energy 14, for instance a super capacitor, and an electronic part 15. The DMTc device is connected, through the intermediary of charge indicator 13, to the positive pole P of battery 11. Start/restart means 16 of the internal combustion engine of the vehicle is electrically connected to the output 17 of the DMTc. The start/restart means 16 can comprise a starter 18 and an alternator-starter or a reversible alternator 19. The starter 18 and the alternator-starter 19 are connected between the output 17 of the DMTc and the mass 20 of the powertrain group GMP. The negative terminal N of battery 11 is connected to the mass 21 of the vehicle body.

The additional energy source 14 serves to compensate the voltage drop of the main energy source (battery 11) during the critical start/restart phase.

The alternator-starter 19 can be a reversible alternator, in other words, a device capable of functioning as an alternator, and therefore as a current generator, when it is driven by the combustion engine. It can also be capable of functioning as electrical motor in order to serve as starter for the restart phases controlled by the Stop & Start system (not shown).

The charge state indicator 13 of the battery can comprise a current sensor and means for measuring the voltage and temperature of the battery.

Figure 3:
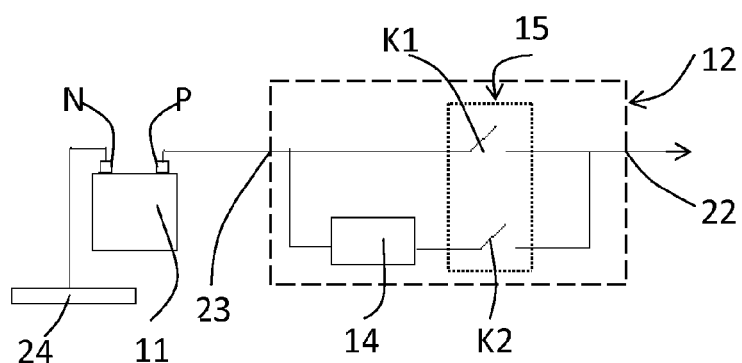

FIG. 3 shows a diagram of the voltage maintaining device DMT 12. The positive terminal P of battery 11 is connected to input 23 of DMT 12 and more precisely with the additional energy source 14 and the electronic part 15. The electronic part 15 is comprised mainly of two switches K1 and K2, for instance MOSFET type power transistors (for instance four SPPB-100 NO3 type transistors connected in parallel to support the start and restart currents in the implementation mode of FIG. 1). The output 22 of the DMT is connected to the onboard electrical network and, in the implementation mode of FIG. 1, to the start/restart means 16.

Switch K1 is permanently closed (in order to direct the current flow to the onboard electrical network), except during the restart phases and if necessary during the start phases. Most of the time, the current flows through switch K1, while the battery supplies the onboard electrical network. Conversely, the switch K2 is permanently in an open position, except during the restart phases and if necessary during the start phases. When the engine restarts (or starts), the additional source 14 is used: the available voltage for supplying the onboard electrical network and the alternator-starter (or the starter) is the voltage of battery 11, plus the voltage of the additional source.

Switches K1 and K2 are controlled by a processor (not shown), for instance the microprocessor controlling the operation of the engine. This processor performs the acquisition and processing of voltage and current measurements (for instance, the input voltages of switches K1 and K2 and/or the currents flowing through switches K1 and K2). It can also perform the acquisition of external information and derive from it, according to a predefined strategy, the commands for switches K1 and K2.

The input 23 of the DMT is connected to the positive terminal P of battery 11, and the negative terminal N of the battery is connected to the mass 24.

Figure 1:
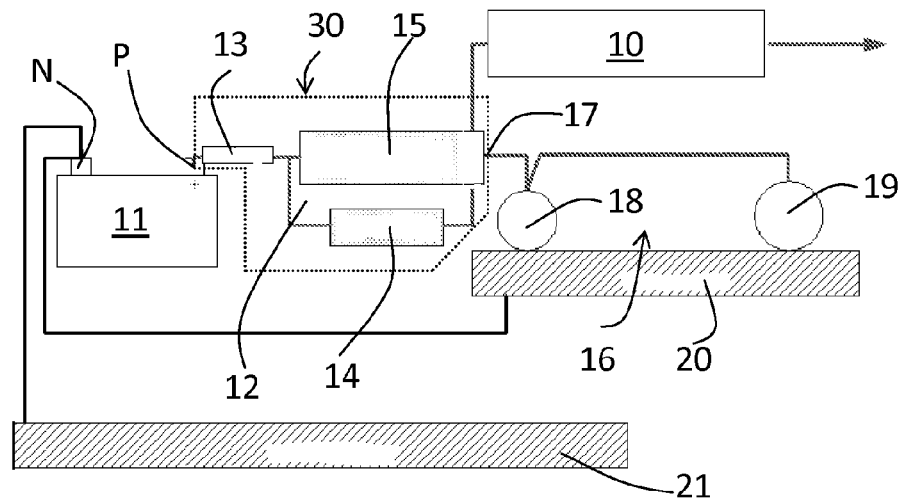
FIG. 1 schematically shows a first embodiment of an electrical power system for a vehicle, FIG. 2 schematically shows a second embodiment of the electrical power system, and FIG. 3 schematically shows a DMT voltage stabilization device.

The DMT of FIG. 1 (DMTc) is called "centralized" because it is located upstream of the whole electrical distribution of the vehicle. In other words, all the electrical current (onboard electrical network and start/restart) of the vehicle passes through the DMTc.

The DMTc ensures two functions: on the one hand, maintaining the voltage level of the onboard electrical network and, on the other hand, providing an electrical power boost for the restart.

Figure 2:
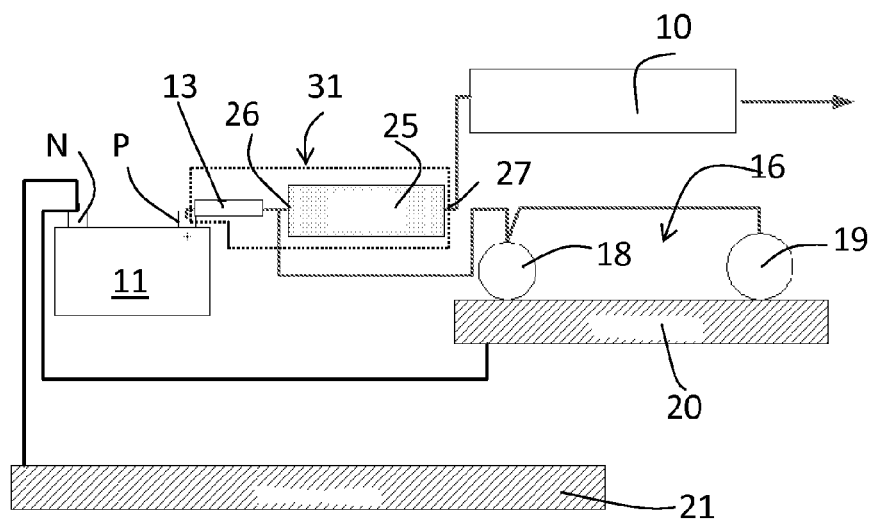

FIG. 2 represents a second embodiment of the invention. The common elements in the two embodiments (FIGS. 1 and 2) are designated by the same reference numbers, namely battery 11 with its positive pole P and negative pole N, the charge status indicator 13 of battery 11, the onboard electrical network 10, the starter 18, the alternator-starter 19, the mass 20 and the mass 21.

The power supply system comprises a DMT 25 (not centralized) of which the input 26 is connected to the P pole of the battery, through the intermediary of the battery charge indicator 13. The output 27 of the DMT is connected to the onboard electrical network 10. The start/restart means 16 (the starter 18 and alternator-starter 19) are connected to the input 26 of the DMT, and therefore is upstream of the DMT. Therefore, the DMT is not centralized. It is called a "grid DMT" because only the electrical current supplied to the onboard electrical network 10 passes through it. The start or restart current no longer passing through it. This DMT 25 therefore ensures the function of maintaining the voltage of the onboard electrical network, but it no longer ensures the "boost" function for the restarts (or starts if necessary) of the combustion engine; this last function is only provided by the battery. The grid DMT is therefore smaller and less costly than a central DMT.

The configuration of the DMT 25 can be identical to that of FIG. 3, but it can be built according to two different technologies: according to a first technology, the super capacitors 14 can be less powerful (and therefore occupy less space): for instance, only one capacitor of 350 F can be used, while for the implementation mode of FIG. 1 two capacitors can be used, each being 650 to 1200 F. The switches K1 and K2 can also be of smaller dimensions because of the lower intensity of the electrical currents flowing through them. According to another technology, the super capacitors are replaced by a current converter.

According to an advantageous embodiment, the charge indicator 13 and the DMT 12 or 25 can be mounted in the same housing 30 in FIG. 1, or housing 31 in FIG. 2. When the power supply system comprises means for distributing the electrical current to the different electricity consuming devices of the vehicle, such as the electrical protection means, for example, fuses, and the switching means, for example, relays or switches, these means can be contained in the same housing 30 or 31 starting from the battery. Housing 30 or 31 can contain only two (or more) of these means or indicator 13 or DMT 12 according to the possibilities and the advantage of grouping these elements. Certain functions may be common, allowing for the use of only one element to perform the same functions. For instance, the current sensor of the charge indicator 13 can be shared with the current indicator of the DMTc function. The same applies to the voltage measurements means. Therefore, the components of the power supply system can be optimized starting from the battery.

To be noted that the DMT grid connection to the positive pole P of the battery eliminates the risk of current circulating between the mass 20 of the powertrain group and the mass 21 of the body. This risk can exist if the DMT is connected to the N pole of the battery.

Other implementation modes than those described and shown can be conceived by a person skilled in the art without exceeding the scope of the present invention. For instance, the DMT can only involve part of the devices connected to the onboard electrical network.

The invention claimed is:

1. An electrical power supply system for a vehicle having internal combustion engine equipped with an automatic start and restart device of the combustion engine; said power supply system comprising an onboard electrical network to which electricity consuming devices are connected, means for starting/restarting the engine, a battery electrically connected to the onboard electrical network and the start/restart means, and a voltage maintaining device for maintaining the voltage during an engine restart; the voltage maintaining device including an input and an output; the onboard electrical network being connected to the output of the voltage maintaining device and the battery being connected to the input of the voltage maintaining device; the voltage maintaining device being connected to a positive pole of the battery; the start/restart means being connected to the battery upstream of the voltage maintaining device; wherein the current supplied to the onboard electrical network passes through the voltage maintaining device and the current supplied to the start/restart means does not pass through the voltage maintaining device.

2. The power supply system according to claim 1 wherein the voltage maintaining device is connected to a positive pole of the battery.

3. The power supply system according to claim 2 wherein the start/restart means of the engine is connected to the voltage maintaining device downstream of the voltage maintaining device.

4. The power supply system according to claim 3 wherein the voltage maintaining device is a centralized device through which all the electrical current of the vehicle flows.

5. The power supply system according to claim 2 wherein the start/restart means is connected to the battery upstream of the voltage maintaining device.

6. The power supply system according to claim 3 wherein the start/restart means is connected between the voltage maintaining device and a GMP mass.

7. The power supply system according to claim 5 wherein the start/restart means is connected between the battery and a GMP mass.

8. A device according to claim 1 wherein the start/restart means comprises either a starter and an alternator or an alternator-starter.

9. A device according to claim 1 wherein the vehicle is equipped with electrical energy consuming devices, the power supply system comprising a housing comprising at least two of the following elements: a battery charge indicator, means for distributing electrical energy between the devices of the vehicle, means for electrical protection of the devices of the vehicle, means for electrical switching of the devices, and the voltage maintaining device.

10. An electrical power supply system for a vehicle having internal combustion engine equipped with an automatic start and restart device of the combustion engine; said power supply system comprising an onboard electrical network to which electricity consuming devices are connected, means for starting/restarting the engine, a battery electrically connected to the onboard electrical network and the start/restart means, and a voltage maintaining device for maintaining the voltage during an engine restart; the voltage maintaining device comprising an input, an output, a first switch, a second switch, and a second energy source; said first and second switches being connected in parallel; and said second energy source being in connected series with said second switch and in parallel with said first switch; the onboard electrical network being connected to the output of the voltage maintaining device and the battery being connected to the input of the voltage maintaining device.

11. The power supply system of claim 10 wherein the first and second switches are controlled such that when the first switch is closed the second switch is opened, and when the first switch is opened the second switch is closed.

12. The power supply of claim 10 wherein the first switch is a normally closed switch and the second switch is a normally opened switch.

* * * * *